P. GAGNON.
SAW JOINTER.
APPLICATION FILED DEC. 7, 1910.
1,079,232.
Patented Nov. 18, 1913.
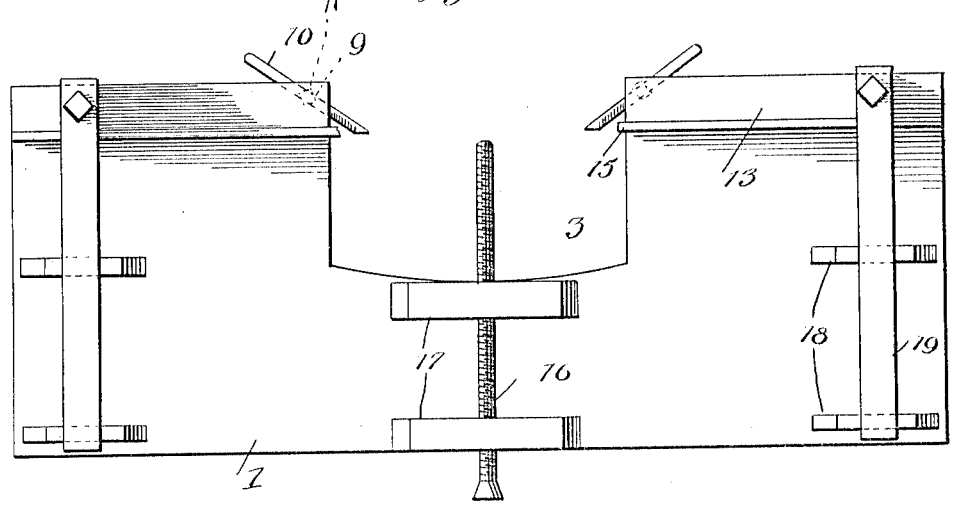
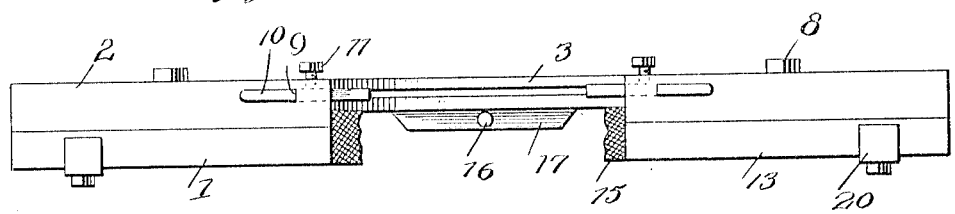
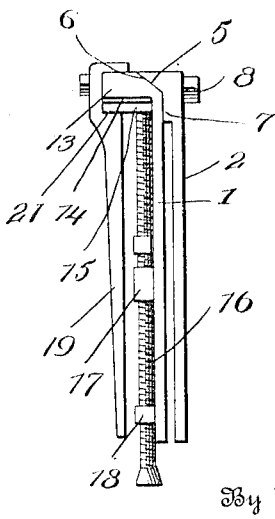
Inventor
Peter Gagnon.
Witnesses
William Smith
By Victor J. Evans
Attorney

UNITED STATES PATENT OFFICE.

PETER GAGNON, OF SHELTON, WASHINGTON, ASSIGNOR OF ONE-HALF TO BERNARD J. DUFFY, OF SEATTLE, WASHINGTON.

SAW-JOINTER.

1,079,232.  Specification of Letters Patent.  Patented Nov. 18, 1913.

Application filed December 7, 1910.  Serial No. 596,088.

*To all whom it may concern:*

Be it known that I, PETER GAGNON, a citizen of the United States, residing at Shelton, in the county of Mason and State of Washington, have invented new and useful Improvements in Saw-Jointers, of which the following is a specification.

This invention relates to gages for swaging and jointing cross cut saws.

The object of the invention is the provision of means whereby a cross cut saw may have its raker teeth readily swaged to a proper degree and whereby the operation of jointing or filing the teeth may be readily accomplished.

A still further object of the invention is the provision of a pair of guiding plates adapted to be mounted upon a saw blade and having swage gages and guides for the saw blade which hold the device in proper relation to the saw when the same is being filed and means is also provided for holding the file in position.

Further objects of the invention will appear as the following specific description is read in connection with the accompanying drawing which forms a part of this application, and in which:

Figure 1 is a side elevation. Fig. 2 is an end elevation. Fig. 3 is a top plan view.

Referring more particularly to the drawing 1 and 2 represent the separate plates, both of which are provided with notches 3 which register with each other so as to expose the raker teeth in swaging. The rear plate 2 is provided with an overhanging flange having a beveled under-surface 5 which is adapted to mate with a similar surface 6 upon the plate 1. At the base of the surface 5 the plate 2 is provided with a ridge 7 which holds the plate 2 spaced from the plate 1. These plates are connected together by set screws 8 and the member 2 is provided with diagonal apertures 9 adapted to receive the gage pins 10 which are held in adjusted position by suitable set screws 11. These gage pins project into the notches and are preferably graduated so that they may be set properly to determine the amount of swaging which is given the raker teeth. The plate 1 is provided with an overhanging flange 13 which forms on its under side a seating shoulder 14 against which a flat file 15 is placed and held in position by means of an elongated set screw 16 traveling in the bosses 17 which project outwardly from the plate 1 and space the saw therefrom. Similar bosses 18 are arranged at either end of the plate and overhanging the bosses 18 and separated therefrom are the guiding arms 19 adjustably secured to the flange 13 and having overhanging arms 20, which lie upon the top of the flange 13. These arms are inwardly offset so as to provide a recess 21 which receives the file and so that the arms 19 assist in holding the file in place.

In the operation of the device the saw blade is placed between the plates and the raker teeth swaged up in any suitable manner, the pins 10 properly gaging the amount of swaging. The blade is then removed from between the plates and placed between the arms 19 and the bosses 17 and 18. The plates are then reciprocated over the saw so as to carry the file over its teeth.

Having thus described the invention, what is claimed is—

A saw jointing device comprising a saw mounting plate, a flange formed upon the plate, spacing bosses projecting from said plate beneath the flange, a file holding screw threaded into certain of said bosses, and arms secured to said flange and overhanging other of said spacing bosses to guide the saw and hold the same in position to be acted upon by the file, said arms lying parallel to the plate.

In testimony whereof I affix my signature in presence of two witnesses.

PETER GAGNON.

Witnesses:
 D. F. WRIGHT,
 GEO. GUNTHER.

Copies of this patent may be obtained for five cents each, by addressing the "Commissioner of Patents, Washington, D. C."